United States Patent
Wang

(10) Patent No.: US 11,734,488 B2
(45) Date of Patent: Aug. 22, 2023

(54) SYSTEM AND METHOD TO PROCESS A VIRTUAL PARTITION CELL INJECTED INTO A HIERARCHICAL INTEGRATED CIRCUIT DESIGN

(71) Applicant: Synopsys, Inc., Mountain View, CA (US)

(72) Inventor: Yulan Wang, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 192 days.

(21) Appl. No.: 17/330,018

(22) Filed: May 25, 2021

(65) Prior Publication Data

US 2021/0374320 A1   Dec. 2, 2021

Related U.S. Application Data

(60) Provisional application No. 63/030,915, filed on May 27, 2020.

(51) Int. Cl.
*G06F 30/392* (2020.01)
*G06F 30/398* (2020.01)

(52) U.S. Cl.
CPC ......... *G06F 30/398* (2020.01); *G06F 30/392* (2020.01)

(58) Field of Classification Search
CPC ........ G06F 30/398; G06F 30/30; G06F 30/39; G06F 30/392; G06F 2119/18; G06F 30/327; G06F 30/394; G06F 2119/12; G06F 2119/02; G06F 30/3308; G06F 30/333; G06F 30/34; G06F 2111/12; G06F 30/13; G06F 30/20; G06F 30/367; G06F 30/3953; G06F 1/04; G06F 2111/04; G06F 30/27; G06F 30/31; G06F 30/33; G06F 30/3315; G06F 9/5066; G06F 2111/20; H01L 2924/15311; H01L 2924/15174; H01L 2224/02375; H01L 24/14; H01L 24/16;

(Continued)

(56) References Cited

U.S. PATENT DOCUMENTS 7,913,206 B1 * 3/2011 Cadouri ............... G06F 30/398
                                                716/112
9,639,648 B2   5/2017 Balkan
(Continued)

OTHER PUBLICATIONS

PCT/US2021/034063 International Preliminary Report on Patentability dated Dec. 8, 2022 consists of 8 pages.
(Continued)

*Primary Examiner* — Binh C Tat
(74) *Attorney, Agent, or Firm* — Patterson + Sheridan, LLP

(57) ABSTRACT

Aspects described herein relate to physical verification of a design of an integrated circuit to be manufactured on a semiconductor die. One example method involves inserting a virtual partition cell in a parent cell of a layout of a design of an integrated circuit. A child cell of the parent cell has a first portion that overlaps the virtual partition cell and a second portion that is outside of the virtual partition cell. The method also includes creating, by one or more processors, a hierarchy of cells having the child cell and the virtual partition cell descending from the parent cell, wherein the child cell has multiple instances in the hierarchy of cells, and performing a design rule check runset on the parent cell based on the hierarchy.

18 Claims, 8 Drawing Sheets

(58) Field of Classification Search
CPC ..... H01L 24/48; H01L 2924/00; H01L 24/49; G03F 1/84; G03F 1/36; G03F 1/68
USPC .................................................. 716/118–125
See application file for complete search history.

(56) References Cited

U.S. PATENT DOCUMENTS

| | | |
|---|---|---|
| 2007/0011636 A1 | 1/2007 | Seidl et al. |
| 2007/0055953 A1* | 3/2007 | Fang .................. G03F 1/36 716/52 |
| 2015/0269301 A1* | 9/2015 | Balkan ............... G06F 30/392 716/122 |

OTHER PUBLICATIONS

PCT/US2021/034063 International Search Report and Written Opinion dated Sep. 13, 2021 consists of 16 pages.
Kai-Ti Hsu et al. "A Hierarchy-Based Distributed Algorithm for Layout Geometry Operations" IEEE Transactions of Computer Aided Design of Integrated Circuits and Systems, vol. 31, No. 10 Oct. 1, 2012, pp. 1546-1557.
Agrawal et al., :Incremental Analysis of Large VLSI Layouts Integration, The VLSI Journal, vol. 42 No./ 2, Feb. 1, 2009, pp. 203-216.

* cited by examiner

SYSTEM AND METHOD TO PROCESS A VIRTUAL PARTITION CELL INJECTED INTO A HIERARCHICAL INTEGRATED CIRCUIT DESIGN

CROSS-REFERENCE TO RELATED APPLICATION

The present disclosure claims priority to U.S. Provisional Application No.: 63/030,915 filed May 27, 2020, which is hereby expressly incorporated by reference herein in its entirety as if fully set forth below and for all applicable purposes.

TECHNICAL FIELD

The present disclosure generally relates to a physical verification system. In particular, the present disclosure relates to a system and method to process a virtual partition cell injected into a hierarchical integrated circuit design.

BACKGROUND

Physical verification generally is a process whereby an integrated circuit layout (IC layout) design is verified via electric design automation (EDA) software tools to ensure correct electrical and logical functionality and manufacturability. Physical verification involves design rule check (DRC), layout versus schematic (LVS), antenna checks, and electrical rule check (ERC).

The design step that produces IC layout is physical design. To manage the complexity of very large scale integrated (VLSI) circuits, a hierarchical approach to physical design has been implemented. Hierarchical physical design generally decomposes the design into blocks based on logical and physical hierarchies in addition to placements of standard cells. Blocks are essentially large cells with child cells placed in it. Hierarchical verification tools can take advantage of the hierarchy in a design to efficiently process the design. Model data may represent the layout geometry used to implement circuitry associated with each of the cells. In hierarchical verification, model data can represent unsolved geometric data for each cell in the hierarchy and can be sent to the cell's parent cells to resolve. Geometric data may be unsolved in a child cell if certain DRC runset commands involve comparison with other geometric data that is not available for the cell. Thus, the unsolved geometric data may be sent to the parent cell to resolve. In at least some hierarchical verification, all cells in a design are processed bottom-up in this hierarchical manner.

However, design hierarchy in a design may not be enough for the increasingly larger design and fast turnaround time (TAT) desired by designers. Computer resource used for larger designs has gone up to hundreds and thousands central processing units (CPUs) through threading and distributed processing for fast TAT. Physical verification tools can inject virtual cells to partition large cells in IC layout for additional hierarchy to lower the memory footprint and improve scalability with threading and distributed processing, thus possibly achieving faster TAT.

SUMMARY

The present disclosure generally relates to a physical verification system. In particular, the present disclosure relates to a system and method to process a virtual partition cell injected into a hierarchical integrated circuit design.

One example method includes inserting a virtual partition cell in a parent cell of a layout of a design of an integrated circuit, wherein a child cell of the parent cell has a first portion that overlaps the virtual partition cell and a second portion that is outside of the virtual partition cell, creating, by one or more processors, a hierarchy of cells having the child cell and the virtual partition cell descending from the parent cell, wherein the child cell has multiple instances in the hierarchy of cells, and performing a design rule check runset on the parent cell based on the hierarchy.

One example apparatus includes a memory, and one or more processors coupled to the memory. The memory and the one or more processors may be configured to: insert a virtual partition cell in a parent cell of a layout of a design of an integrated circuit, wherein a child cell of the parent cell has a first portion that overlaps the virtual partition cell and a second portion that is outside of the virtual partition cell; create a hierarchy of cells having the child cell and the virtual partition cell descending from the parent cell, wherein the child cell has multiple instances in the hierarchy of cells; and perform a design rule check runset on the parent cell based on the hierarchy.

One aspect includes a non-transitory computer-readable medium having instructions stored thereon to cause an apparatus to: insert a virtual partition cell in a parent cell of a layout of a design of an integrated circuit, wherein a child cell of the parent cell has a first portion that overlaps the virtual partition cell and a second portion that is outside of the virtual partition cell; create a hierarchy of cells having the child cell and the virtual partition cell descending from the parent cell, wherein the child cell has multiple instances in the hierarchy of cells; and perform a design rule check runset on the parent cell based on the hierarchy.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

Figure 1:
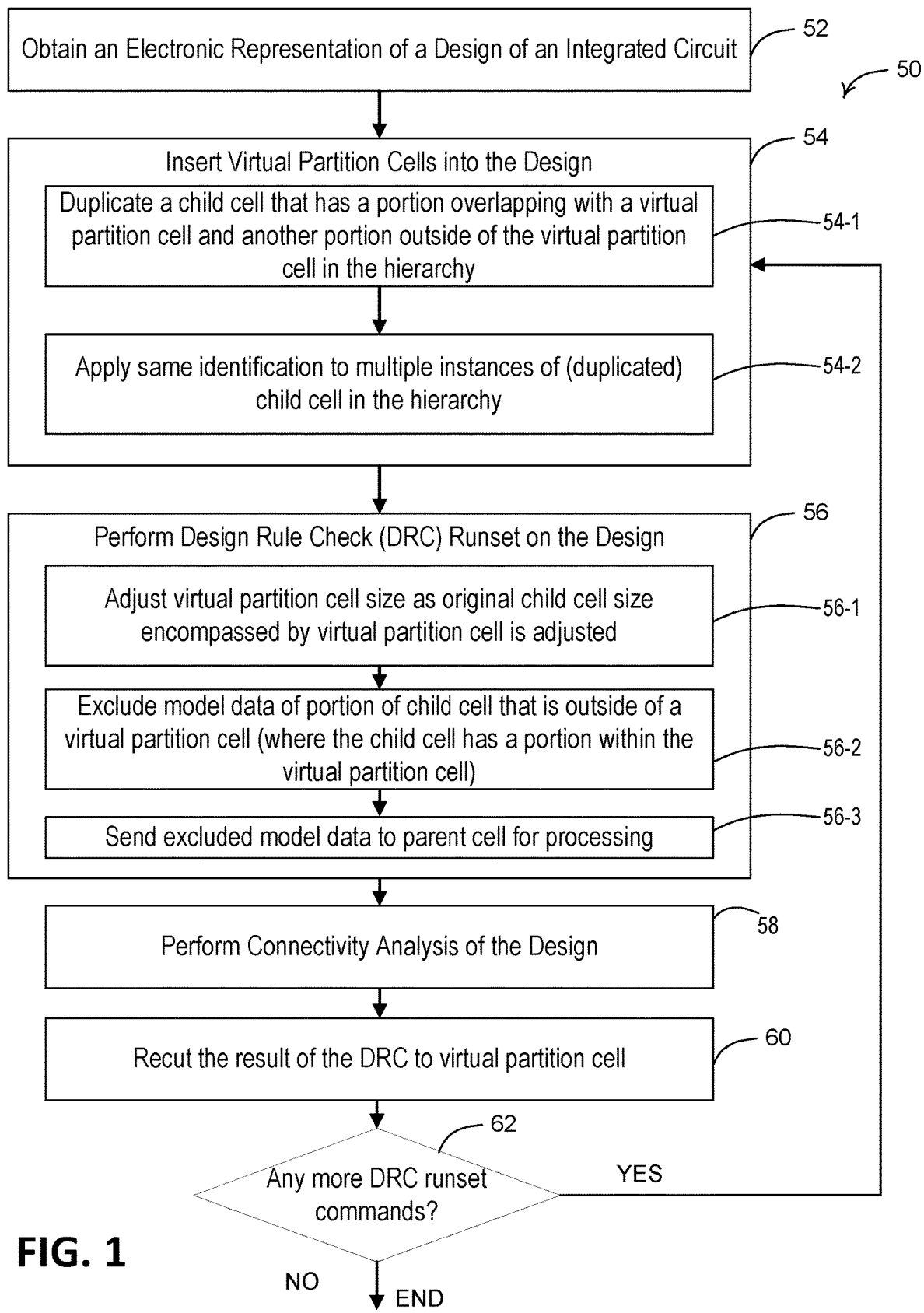
FIG. 1 is a flowchart of a method for physical verification analysis, according to an example embodiment of the present disclosure.

Aspects described herein relate to physical verification of a design of an integrated circuit to be manufactured on a semiconductor die. Examples described herein provide a system and method to process injected virtual partition cells (also referred to herein as virtual cut cells) with respect to overlapping child cells (e.g., siblings). In one example, the present system and method includes growing or increasing a boundary or extent of a virtual partition cell as an enclosed child cell grows, and excluding the virtual partition cell on the model data that is sent to a parent cell to resolve. In one example, the present system and method also include flat net computation consistent to both the parent cell and its virtual partition cells. The present system and method may divide effectively the workload of a large parent cell to its virtual partition cells, and can make virtual partition cells and the parent cell work collectively to deliver benefits of lowered memory footprint and improved scalability. Thus, some examples can achieve faster TAT in physical verification.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Also, various terms are used herein as used in the art, and such terms are intended to encompass the full meaning of those terms as understood by persons having ordinary skill in the art.

FIG. 1 is a flowchart of a method 50 for physical verification analysis, according to an example embodiment of the present disclosure. The method 50 is described below in the context of various figures to illustrate aspects. These figures are provided merely as examples, and a person having ordinary skill in the art will readily understand application of the method 50 in other examples.

As described in further detail below, the method 50 can be embodied by one or more sets of instructions, which may be one or more software modules, stored on a non-transitory computer readable medium. One or more processors of a computer system can be configured to read and execute the one or more sets of instructions, which causes the one or more processors to perform the various operations or steps of the method 50. Further details are provided below. In some examples, some operations or steps of the method 50 can be embodied as one or more sets of instructions as one or more software modules, and other operations or steps of the method 50 can be embodied as one or more other sets of instructions as one or more other software modules. The different software modules can be distributed and stored on different non-transitory computer readable media on different computer systems for execution by respective one or more processors of the different computer systems in some examples.

FIG. 1 is described in the context of various figures described below. These figures are depicted and described to illustrate various aspects of FIG. 1. Other example implementations can implement differing designs, differing hierarchies, or other differing aspects.

At 52 of FIG. 1, an electronic representation of a design of an integrated circuit chip to be manufactured on a semiconductor die is obtained. The electronic representation may be in any format, such as including an OASIS file, or a GDS file, among others. The design includes a layout of cells, which can be logically represented in a hierarchy of those cells. The cells can be representations of various functional and/or logical units in the design. A cell can be, for example, a layout of a static random access memory (SRAM) cell, a buffer cell, etc. These cells indicate the layout of devices and connectivity of the devices within the respective cell. The cells can be, for example, any standard library cells and/or non-standard (e.g., user-defined) cells. The layout of the design can have any number of cell instances of a type of cell. For example, two or more instances of a same type of buffer cell can be included in the design, and each of these instances of a same type of buffer cell are a separate cell for analysis. Any number of cells and any hierarchy can be implemented. For example, 10 to 20 levels of hierarchy can be implemented in the design. Overlap between child cells may be unavoidable in a design. Any number of child cells may have overlap with one or more other child cells, and any number of child cells may have no overlap with any other child cell.

Figure 2:
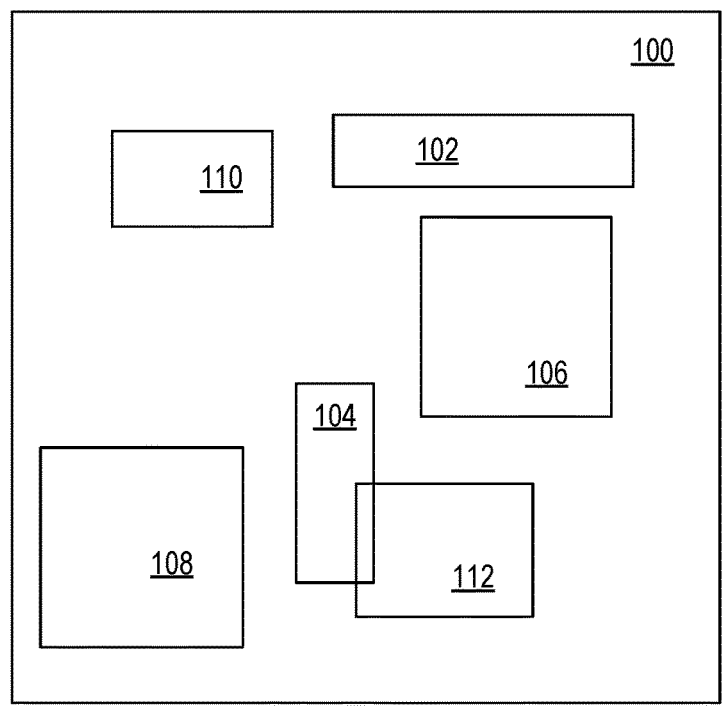
FIG. 2 depicts a parent cell that includes child cells in a design of the integrated circuit, according to an example embodiment of the present disclosure.

FIG. 2 depicts a parent cell 100 that includes child cells in a design of an integrated circuit, according to an example embodiment of the present disclosure. The parent cell 100 includes child cells 102, 104, 106, 108, 110, and 112 in a design of an integrated circuit (e.g., the original design of the integrated circuit). As illustrated, each of child cells 102, 106, 108, and 110 does not overlap with any other child cell, and child cells 104 and 112 overlap with each other. Cell boundaries or extents of the cells of FIG. 2 are illustrated in FIG. 2, and actual circuits and physical device layouts are omitted for clarity. For example, the boundary for cell 110 is shown by the line boundary of the rectangle shown for cell 110 in FIG. 2.

Figure 3:
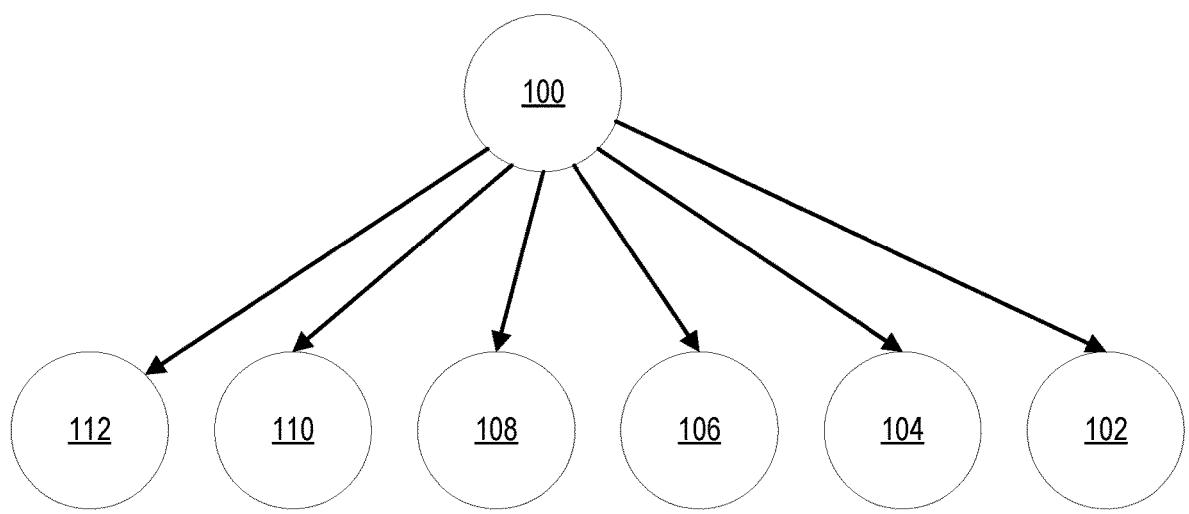
FIG. 3 illustrates a hierarchy tree corresponding to FIG. 2, according to an example embodiment of the present disclosure.

Initially, each child cell 102, 104, 106, 108 110, and 112 is on a same logical level of a hierarchy. Logically, each child cell 102, 104, 106, 108 110, and 112 is a direct descendant (or child) of the parent cell 100 that encompasses the child cells 102, 104, 106, 108 110, and 112. FIG. 3 illustrates a hierarchy tree corresponding to FIG. 2, according to an example embodiment of the present disclosure.

At 54 of FIG. 1, virtual partition cells are inserted or injected into the design of the integrated circuit. The virtual partition cells permit identification of physical and/or connectivity relations between different child cells where processing of the virtual partition cells can lower the memory and improve scalability. Insertion of a virtual partition cell does not insert additional devices, connections, or other features into the design of the integrated circuit, but inserts a logical construct indicating an extent or boundary of the virtual partition cell in the design to enable an additional level of hierarchy being inserted as described below. The insertion of virtual partition cells can be by any suitable technique. For example, virtual partition cells may be inserted in a manner as to avoid certain objects, also referred to as obstacles. An obstacle may be a region within a layout that cannot be divided into smaller pieces when the cell layout is partitioned as doing so may result in performance penalties during design rule check operations. For example, a dense area of shapes in the cell layout may be considered an object that may be avoided when inserting virtual partition cells. Other techniques for inserting virtual partition cells may not involve consideration of obstacles. For example, rows of virtual partition cells may be injected as a way of partitioning the layout for improving design rule check performance. In some cases, due to the quantity and locations of other cells in a layout, one or more virtual partition cells may be added that overlap one or more other cells, or completely encompass one or more other cells.

Each virtual partition cell inserts a logical hierarchical level within the hierarchy of the parent cell in which the virtual partition cell is inserted. Any and each cell encompassed by or that overlaps in any portion an inserted virtual partition cell becomes a child cell to that respective virtual partition cell. Like child cells, as a practical matter, overlap of one or more virtual partition cells with some other one or more child cells may be unavoidable in a design.

Figure 4:
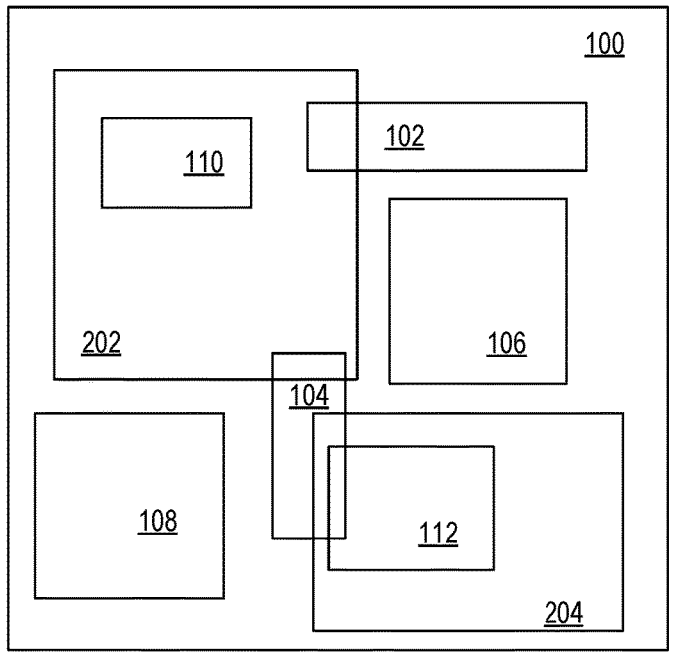
FIG. 4 shows insertion of virtual partition cells in the parent cell of FIG. 2, according to an example embodiment of the present disclosure.

FIG. 4 shows insertion of virtual partition cells 202, 204 in the parent cell 100 of FIG. 2. As shown in FIG. 4, virtual partition cell 202 encompasses child cell 110 and overlaps respective portions of child cells 102, 104. The size and location of the virtual partition cells 202, 204 in the parent cell 100 are only examples to provide knowledge and understanding of aspects described herein and do not limit the scope of the disclosure to these specific examples. Virtual partition cell 204 encompasses child cell 112 and overlaps a portion of child cell 104 (that is distinct from the portion that the virtual partition cell 202 overlaps).

A logical hierarchy is created with the insertion of the virtual partition cells of 54. In the hierarchy, a child cell that has a portion overlapping with a virtual partition cell and another portion outside of the virtual partition cell is duplicated in the hierarchy, as shown in 54-1 of FIG. 1. Duplicated child cells that are duplicated in the hierarchy are applied a same identification (e.g., same identifier number), as shown in 54-2.

In creating the logical hierarchy, a virtual partition cell becomes a direct descendant or child of a parent cell into which the virtual partition cell is inserted. A child cell is a direct descendant or child of a given virtual partition cell if the child cell has a portion within the boundaries or extent of the virtual partition cell (e.g., overlaps the virtual partition cell). Additionally, a child cell is removed as a direct descendant of the parent cell if no portion of the child cell is outside of a virtual partition cell, and hence, a virtual partition cell adds a level of hierarchy between a child cell and the parent cell (making the child cell into a grandchild cell) if the child cell is wholly encompassed by the virtual partition cell. As indicated by these guidelines, if a child cell has a portion overlapping a virtual partition cell and a portion outside of the virtual partition cell but still in its direct ancestor or parent cell, that child cell is duplicated having an instance that is a direct descendent or child of the virtual partition cell and another instance that is a direct descendant or child of the direct ancestor or parent cell. In other words, wherein a first instance of the child cell may be in a first tier of the hierarchy, and a second instance of the child cell may be in a second tier of the hierarchy, the second tier being lower in the hierarchy than the first tier.

Figure 5:
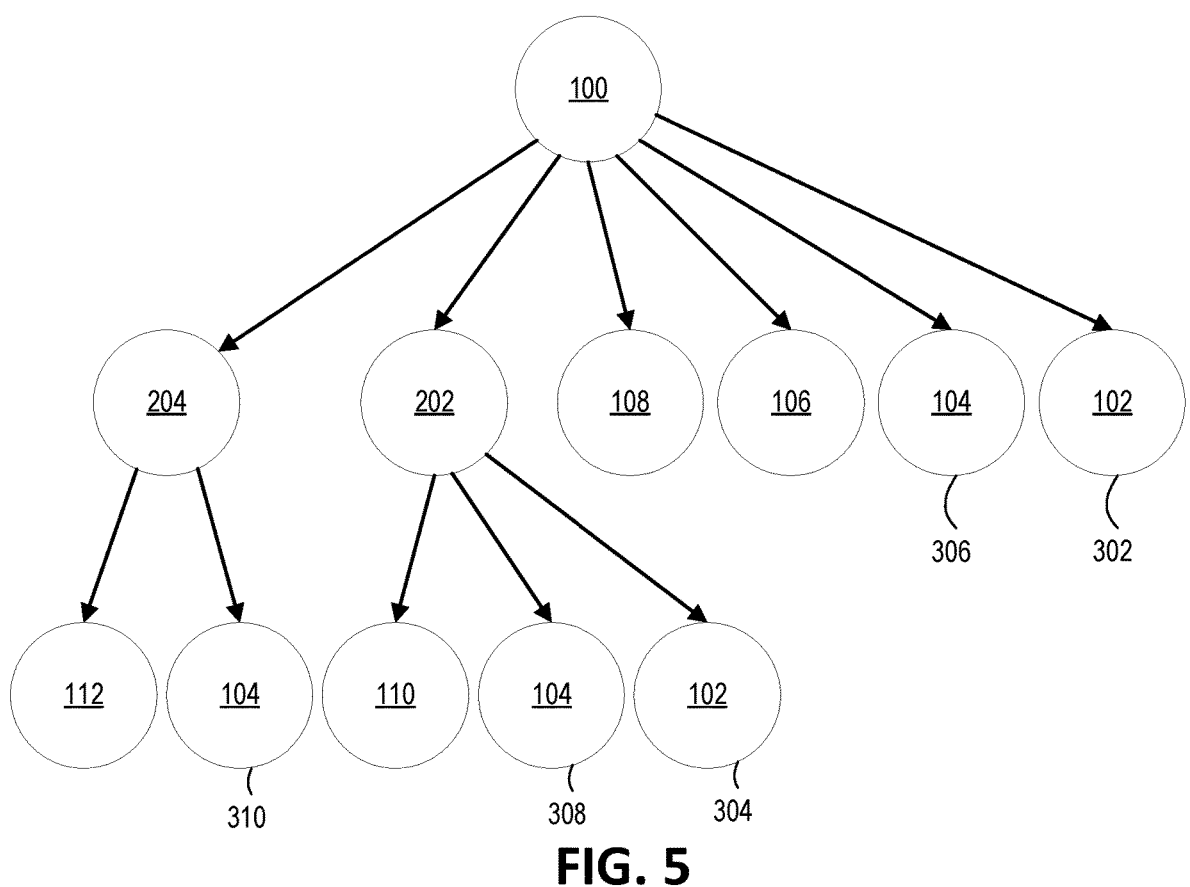
FIG. 5 illustrates the creation of the logical hierarchy based on the insertion of the virtual partition cells in FIG. 4, according to an example embodiment of the present disclosure.

FIG. 5 illustrates the creation of the logical hierarchy based on the insertion of the virtual partition cells 202, 204 in FIG. 4. As shown in FIGS. 4 and 5, virtual partition cells 202, 204 become direct descendants or children of the parent cell 100. Child cells 102, 104, 110 have respective portions within virtual partition cell 202 and become a direct descendant or child of a virtual partition cell 202. Child cells 104, 112 have respective portions within virtual partition cell 204 and become a direct descendant or child of a virtual partition cell 204. Child cells 110, 112 are wholly encompassed by the virtual partition cell 202, 204, respectively, and hence, child cells 110, 112 are removed from being a direct descendant of the parent cell 100. In this illustrated example, child cell 102 has a portion within the virtual partition cell 202 and a portion within the parent cell 100 that is not within the virtual partition cell 202, and hence, the child cell 102 has two (duplicated) instances 302, 304 in the hierarchy, where one instance 302 is a direct descendant or child of the parent cell 100 and the other instance 304 is a direct descendant or child of the virtual partition cell 202. Similarly, child cell 104 has a portion within the virtual partition cell 202, a portion within the virtual partition cell 204, and a portion within the parent cell 100 that is not within the virtual partition cell 202 or virtual partition cell 204, and hence, the child cell 104 has three (duplicated) instances 306, 308, 310 in the hierarchy, where one instance 306 is a direct descendant or child of the parent cell 100, another instance 308 is a direct descendant or child of the virtual partition cell 202, and the other instance 310 is a direct descendant or child of the virtual partition cell 204.

For each child cell, as indicated by 54-2, multiple instances of the respective child cell within the hierarchy are provided with a same identification. For example, referring to FIG. 5, the multiple instances 302, 304 of child cell 102 are provided a same identification that is unique from other cells within the parent cell 100, and the multiple instances 306, 308, 310 of child cell 104 are provided a same identification that is unique from other cells within the parent cell 100. Other child cells each having a single instance may also be provided with a respective unique identification.

Referring back to FIG. 1, at 56, a design rule check (DRC) runset is performed on the design with the inserted virtual partition cells. The DRC runset can be a set of commands (also referred to as design rule check commands) that executes to detect violations of the design against design rules. Through this execution, intermediate layers can be derived from the layout of the various cells, and each child cell can have boundaries or extents that grow or shrink based on the execution of these commands. For each virtual partition cell, the respective virtual partition cell can grow or shrink based on any child cell wholly within or encompassed by the virtual partition cell. At 56-1, a size of a virtual partition cell is adjusted as a size of an original child cell encompassed by the virtual partition cell is adjusted. Any child cell that has a portion within and another portion outside the extent or boundaries of the virtual partition cell is not used to grow or shrink that virtual partition cell. Referring to FIG. 4, virtual partition cell 202 can grow or shrink based on whether child cell 110 grows or shrinks irrespective of whether child cells 102, 104 grow or shrink. Similarly, virtual partition cell 204 can grow or shrink based on whether child cell 112 grows or shrinks irrespective of whether child cell 104 grows or shrinks.

The performance of the DRC runset can be a distributed, bottom-up process. For example, DRC runset may be performed for the cells lowest in the hierarchy, followed by next lowest cells in the hierarchy, and so on until the DRC runset is performed for the parent cell. Cells that do not have child-parent or other descendent/ancestral relations can be processed independently, which can permit concurrent processing of the cells. Therefore, non-overlapping virtual partition cells can be processed concurrently. In other words, virtual partition cell 202 is non-overlapping with virtual partition cell 204. The non-overlapping virtual partition cells 202, 204 may be processed concurrently since processing of one of the virtual partition cells (e.g., virtual partition cell 202) does not depend on results from processing of the other one of the virtual partition cells (e.g., virtual partition cell 204). Thus, virtual partition cell 202 may be processed (including area 404 of cell 104) concurrently with virtual partition cell 204 (e.g., including area 406 of cell 104).

Results from processing a cell can be sent to a direct ancestor cell for incorporating those results into the processing of the ancestor cell. In other words, once a DRC runset is performed for a child cell, the results of the DRC runset for the child cell may be provided for performing a DRC runset for the parent cell. Thus, geometric data for the parent cell may be resolved for a particular DRC runset command based on the results of the DRC runset for the child cell.

For any virtual partition cell that overlaps with a child cell and that child cell has a portion outside of that virtual partition cell, at 56-2, the model data of the portion of the child cell that is outside of the virtual partition cell is excluded from the virtual partition cell during processing of the virtual partition cell and, at 56-3, the excluded model data is sent to the direct ancestor cell (e.g., parent cell) for processing during processing of the direct ancestor cell. This permits the virtual partition cells to be processed independently, and the results of processing the virtual partition cells are sent to the parent cell of the virtual partition cell, which can result in a reduction of model data to the parent cell, which can further reduce resources, such as memory, used to process the parent cell. Whether a child cell has a portion that overlaps with the virtual partition cell and has another portion outside of the virtual partition cell can be determined based on the instances of the child cell in the hierarchy. A child cell meeting this condition has an instance that is a descendant of the virtual partition cell and at least one other instance in the hierarchy that is not a descendant of the virtual partition cell.

Figure 6:
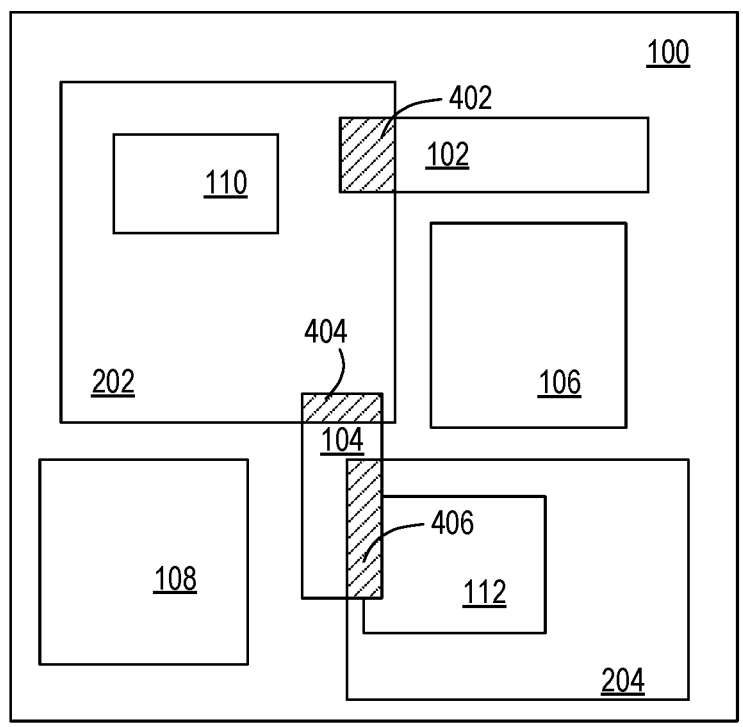
FIG. 6 shows excluded areas where model data is sent to and processed with the parent cell, according to an example embodiment of the present disclosure.

FIG. 6 shows areas where model data is sent to and processed with the parent cell 100. Area 402 is an area that child cell 102 overlaps with virtual partition cell 202 where a remaining portion of the child cell 102 is outside of the virtual partition cell 202. Area 404 is an area that child cell 104 overlaps with virtual partition cell 202 where a remaining portion of the child cell 104 is outside of the virtual partition cell 202. Area 406 is an area that child cell 104 overlaps with virtual partition cell 204 where a remaining portion of the child cell 104 is outside of the virtual partition cell 204. Model data of child cell 102 corresponding to overlapped area 402 is excluded from the parent cell 100 for processing, and model data of the child cell 102 corresponding to the remaining non-overlapped area (excluding area 402 and outside of the virtual partition cell 202) is excluded from processing with the virtual partition cell 202 and may be sent to the parent cell 100 for processing of the parent cell 100. Model data of child cell 104 corresponding to area 404 is excluded from the parent cell 100 for processing, and model data of child cell 104 corresponding to area 406 is excluded from the parent cell 100 for processing. Model data of the child cells 102, 104 corresponding to the respective remaining areas (excluding area 404, 406 and outside of the virtual partition cells 202, 204, respectively) are excluded from processing with the respective virtual partition cell 202, 204 and may be sent to the parent cell 100 for processing of the parent cell 100

Referring back to FIG. 1, at 58, a connectivity analysis of the design is performed. Nets within cells and connectivity of nets between cells are identified. Nets are then assigned respective identifications (also referred to herein as identifiers). Nets are assigned identifications per cell. Nets of cells in the parent cell and included child cells that do not have connections outside the parent cell are given unique flat net identifications (e.g., identification numbers) in the parent cell. Flat nets are computed by offsetting number of nets in child cell for the next child cell.

Figure 7:
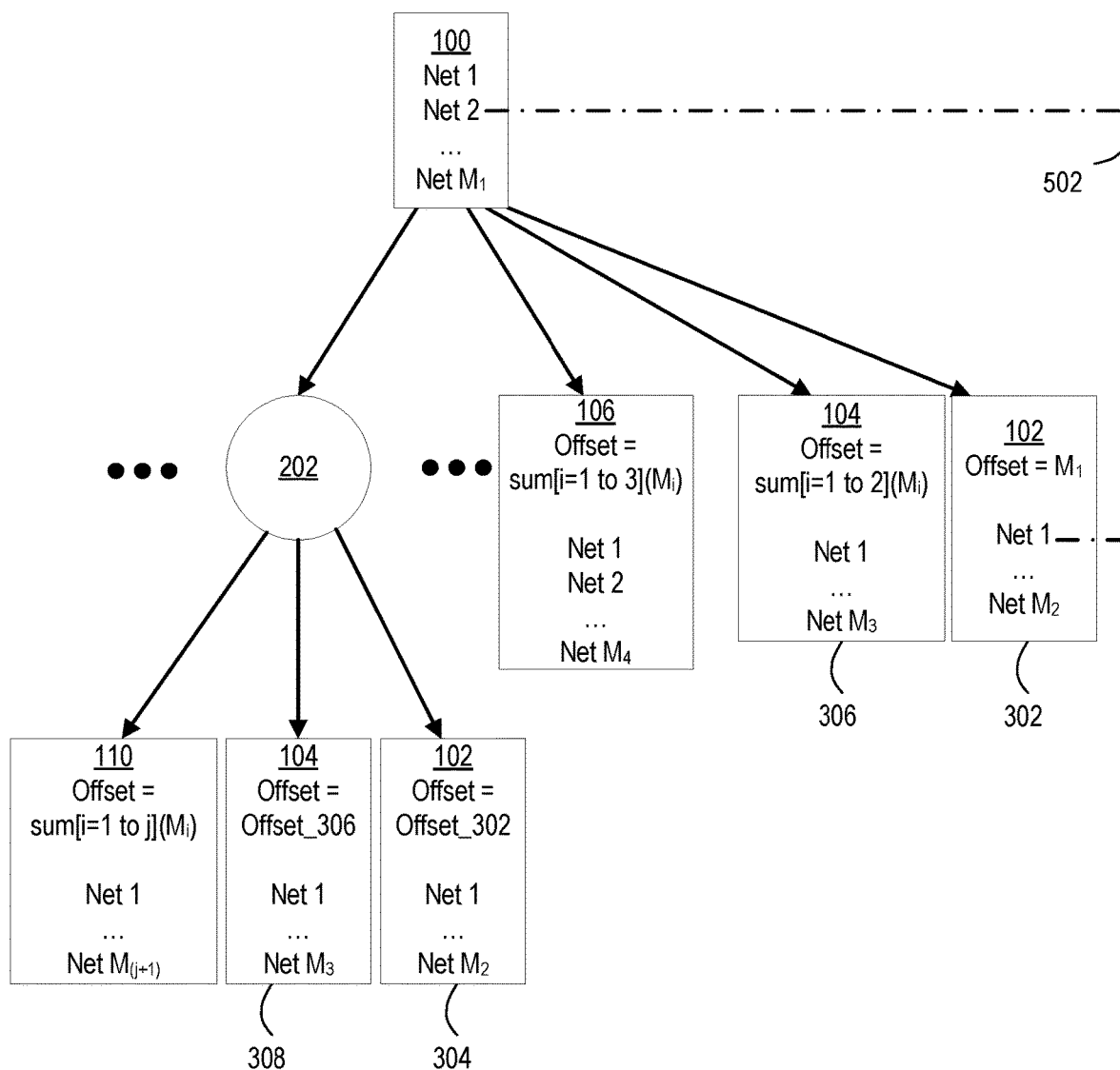
FIG. 7 shows aspects of assigning identifications to nets within an abbreviated portion of the hierarchy of FIG. 5, according to an example embodiment of the present disclosure.

FIG. 7 shows aspects of assigning identifications to nets within an abbreviated portion of the hierarchy of FIG. 5 as an example. Nets in the parent cell 100 are identified and assigned, and nets in first instances of child cells are identified and assigned using an accumulated offset. Although not illustrated, each cell can have an internal offset within the cell for assigning numerical identifiers to nets.

Parent cell 100 is illustrated as having $M_1$ number of nets (e.g., net 1 to net $M_1$). Parent cell 100 has no accumulated offset or an accumulated offset of 0. First instance 302 of child cell 102 is illustrated as having $M_2$ number of nets (e.g., net 1 to net $M_2$) with an accumulated offset of $M_1$. Hence, the nets of the first instance 302 of child cell 102 are assigned numerical identifiers of net $(M_1+1)$ through net $(M_1+M_2)$. First instance 306 of child cell 104 is illustrated as having $M_3$ number of nets (e.g., net 1 to net $M_3$) with an accumulated offset of $(M_1+M_2)$. Hence, the nets of the first instance 306 of child cell 104 are assigned numerical identifiers of net $(M_1+M_2+1)$ through net $(M_1+M_2+M_3)$. First instance of child cell 106 is illustrated as having $M_4$ number of nets (e.g., net 1 to net $M_4$) with an accumulated offset of $(M_1+M_2+M_3)$. Hence, the nets of the first instance of child cell 106 are assigned numerical identifiers of net $(M_1+M_2+M_3+1)$ through net $(M_1+M_2+M_3+M_4)$. This continues for respective first instances of cells, which can be generalized as shown for child cell 110. The accumulated offset for child cell 110 is $\Sigma_{i=1}^{j} M_i$, where j is the number of preceding cells analyzed such that the sum is the accumulation of the number of nets for the preceding cells that were analyzed. The child cell 110 has $M_{(j+1)}$ number of nets, such that the assigned numerical identifiers are net $(1+\Sigma_{i=1}^{j} M_i)$ through net $(M_{(j+1)}+\Sigma_{i=1}^{j} M_i)$. The accumulated offsets can be maintained in a look-up table that correlates each accumulated offset to a corresponding instance of a cell. Although the virtual partition cell 202 is not illustrated as including a net, a virtual partition cell can include one or more nets.

Subsequent instances of a child cell, such as descending from a virtual partition cell, can refer to the first instance of the corresponding child cell. Hence, each instance of a given child cell can have a same accumulated offset within a look-up table. Determining which instances are subsequent instances can be based on the identification of multiple instances of a child cell in a hierarchy determined at 54, as described above.

FIG. 7 shows second instance 304 of child cell 102 having $M_2$ number of nets (as described above), and the accumulated offset is the accumulated offset of the first instance 302

(Offset_302). Similarly, FIG. 7 shows second instance 308 of child cell 104 having $M_3$ number of nets (as described above), and the accumulated offset is the accumulated offset of the first instance 306 (Offset_306). Hence, the assigned numerical identifiers of respective nets of the multiple instances of a same child cell are the same through the multiple instances of the same child cell in the hierarchy.

The identifiers for flat nets of child cells descending from a virtual partition cell can be resolved in two passes. Flat nets can be computed, and duplicated child cells descending from a virtual partition cell can be skipped in a first pass. In a second pass, flat nets offsets for the duplicated child cells are obtained by the same instance identifier originating from the parent cell, such that the same flat net numbers in the virtual partition cell or the parent cell are implemented. The pseudocode below illustrates these passes:

```
Flat nets for virtual partition cell C:
num_flat_nets = C->num_nets;
For child placements of C {
    If (duplicated_sibling) continue;
    offset_of_this_placement = num_flat_nets;
    num_flat_nets += child->num_flat_nets;
}
Flat nets for cell P
num_flat_nets = P->num_nets;
For child placements of P {
    offset_of_this_placement = num_flat_nets;
    num_flat_nets += child->num_flat_nets;
}
```

Children of cell P are ordered with virtual cut cells before non-virtual cut cells. Assigning numerical identifiers to nets in such a manner can result in consecutive net numbers contained in the parent cell, child cells, and virtual partition cells.

Connectivity of nets between cells can also be determined. Referring to FIG. 7, an example connection 502 is illustrated between net 1 of child cell 102 (e.g., numerical identifier net ($M_1+M_2+M_3+1$)) to net 2 of parent cell 100 (e.g., numerical identifier net 2). Other connections between nets of different cells can similarly be determined. Connections of a child cell with multiple instances in the hierarch can be associated with the first instance of the child cell, and subsequent instances can refer to the first instance, for example.

Figure 8:
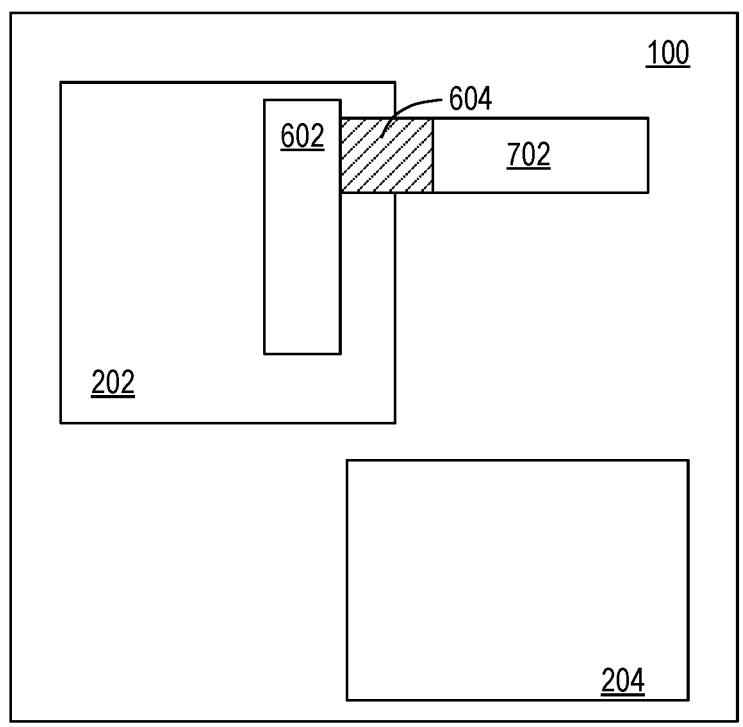
FIG. 8 shows aspects of recutting results to a virtual partition cell, according to an example embodiment of the present disclosure.

After performance of the DRC runset, at 60, the result of the DRC from the parent cell is recut to a virtual partition cell. For example, referring to FIG. 8, a child cell data 602 is illustrated encompassed by virtual partition cell 202. As indicated previously, child cell 102 (e.g., corresponding to child cell data 702) has a portion that overlaps the virtual partition cell 202 and has a portion outside of the virtual partition cell 202. A proximity flag 604 flags the child cell data 602 as being in proximity with the child cell data 702. After performing a check in the DRC runset, the result in parent cell 100 is recut and/or repartitioned to the corresponding virtual partition cell 202 and virtual partition cell 202 extents. For example, geometric data used to resolve a DRC runset command of the parent cell may be in proximity to the cell associated with child cell data 602. Thus, due to this proximity, the results of the DRC runset for child cell data 702 may be provided to (e.g., recut or repartitioned to) the virtual partition cell 202 to use when performing the DRC runset for the child cell 202. The result can be recut into any number of virtual partition cells that are non-overlapping. In other words, performing the DRC runset may involve executing a chain of DRC commands. A portion of results for a command executed for the parent cell may be recut to the virtual partition cell. Thus, executing a subsequence DRC command for the virtual partition cell may be based on the portion of the results for the previous command executed for the parent cell.

By performing the above operations, virtual partition cells and the parent cell can collectively complete the checking for parent cell and can consume much reduced memory. Virtual partition cells can be run concurrently for improved scalability.

Operation of 54-60 can be performed multiple times. Various iterations can implement different virtual partition cells, for example. The 54-60 can be repeated for each DRC runset command that is to be executed. As indicated in FIG. 1 at 62, a determination is made whether any more DRC runset commands are to be executed. If so, the method 50 loops to 54, and if not, the method may end or return. In some examples, an iteration may omit the connectivity analysis of 58.

Information gathered from the physical verification, any violations of design rules and/or failures in connectivity can be addressed and resolved in the design. Iterative physical verification can be performed based on any resolved design. The design can subsequently be analyzed, such as described below.

A person having ordinary skill in the art will readily understand various data structures that may be implemented in the above process. For example, a class of a parent cell, a virtual partition cell, and child cell can be defined. Each class can indicate any logical ascent and/or descent to indicate a logical hierarchy. Each instance of an object of a class can include data indicative of boundaries or extents in a layout, can include nets in the corresponding cell, or other information or data. Different data structures and/or modified data structures can be used in different examples. Additionally, a person having ordinary skill in the art will readily understand various modifications to the logical and/or mathematical expressions of examples described herein. Other examples contemplate such modifications.

Figure 9:
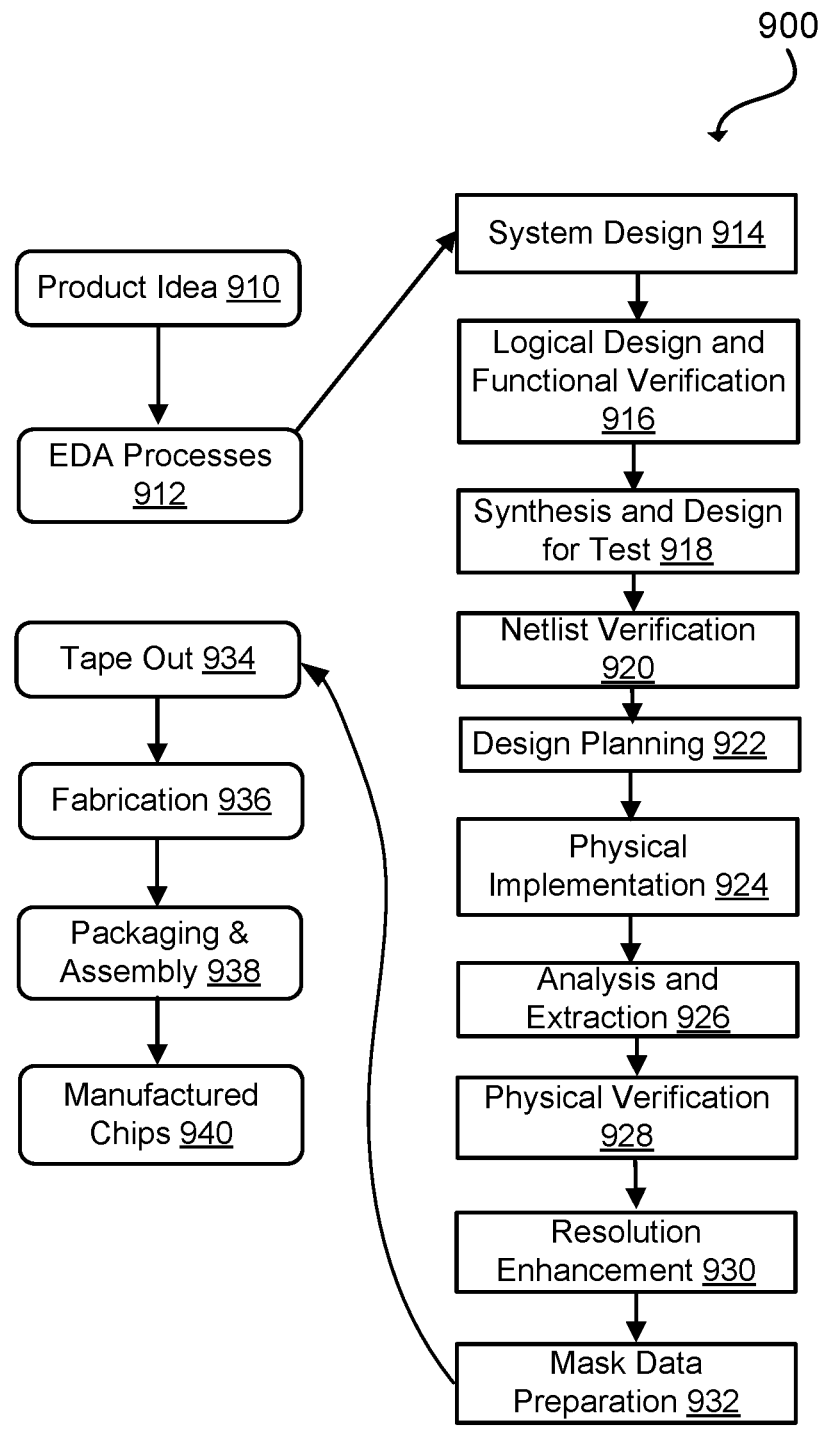
FIG. 9 illustrates an example set of processes used during the design, verification, and fabrication of an integrated circuit on a semiconductor die to transform and verify design data and instructions that represent the integrated circuit in which examples described herein may be implemented.

FIG. 9 illustrates an example set of processes 900 used during the design, verification, and fabrication of an integrated circuit on a semiconductor die to transform and verify design data and instructions that represent the integrated circuit. Each of these processes can be structured and enabled as multiple modules or operations. The term "EDA" signifies Electronic Design Automation. These processes start, at 910, with the creation of a product idea with information supplied by a designer, information that is transformed to create an integrated circuit that uses a set of EDA processes, at 912. When the design is finalized, the design is taped-out, at 934, which is when artwork (e.g., geometric patterns) for the integrated circuit is sent to a fabrication facility to manufacture the mask set, which is then used to manufacture the integrated circuit. After tape-out, at 936, the integrated circuit is fabricated on a semiconductor die, and at 938, packaging and assembly processes are performed to produce, at 940, the finished integrated circuit (oftentimes, also referred to as "chip" or "integrated circuit chip").

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower representation level that is a more detailed description adds more useful detail into the design description, such as, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described may be enabled by EDA products (or tools).

During system design, at 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, at 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some examples, special systems of components, referred to as emulators or prototyping systems, are used to speed up the functional verification.

During synthesis and design for test, at 918, HDL code is transformed to a netlist. In some examples, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, at 920, the netlist is checked for compliance with timing constraints and for correspondence with the HDL code. During design planning, at 922, an overall floor plan for the integrated circuit is constructed and analyzed for timing and top-level routing.

During layout or physical implementation, at 924, physical placement (positioning of circuit components, such as transistors or capacitors) and routing (connection of the circuit components by multiple conductors) occurs, and the selection of cells from a library to enable specific logic functions can be performed. As used herein, the term "cell" may specify a set of transistors, other components, and interconnections that provides a Boolean logic function (e.g., AND, OR, NOT, XOR) or a storage function (such as a flip-flop or latch). As used herein, a circuit "block" may refer to two or more cells. Both a cell and a circuit block can be referred to as a module or component and are enabled as both physical structures and in simulations. Parameters are specified for selected cells (based on standard cells) such as size and made accessible in a database for use by EDA products.

During analysis and extraction, at 926, the circuit function is verified at the layout level, which permits refinement of the layout design. During physical verification, at 928, the layout design is checked to ensure that manufacturing constraints are correct, such as design rule check (DRC) constraints, electrical constraints, lithographic constraints, and that circuitry function matches the HDL design specification. Physical verification at 928 can include the method 50 for physical verification analysis of FIG. 1. During resolution enhancement, at 930, the geometry of the layout is transformed to improve how the circuit design is manufactured.

During tape-out, data is created to be used (after lithographic enhancements are applied if appropriate) for production of lithography masks. During mask data preparation, at 932, the tape-out data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
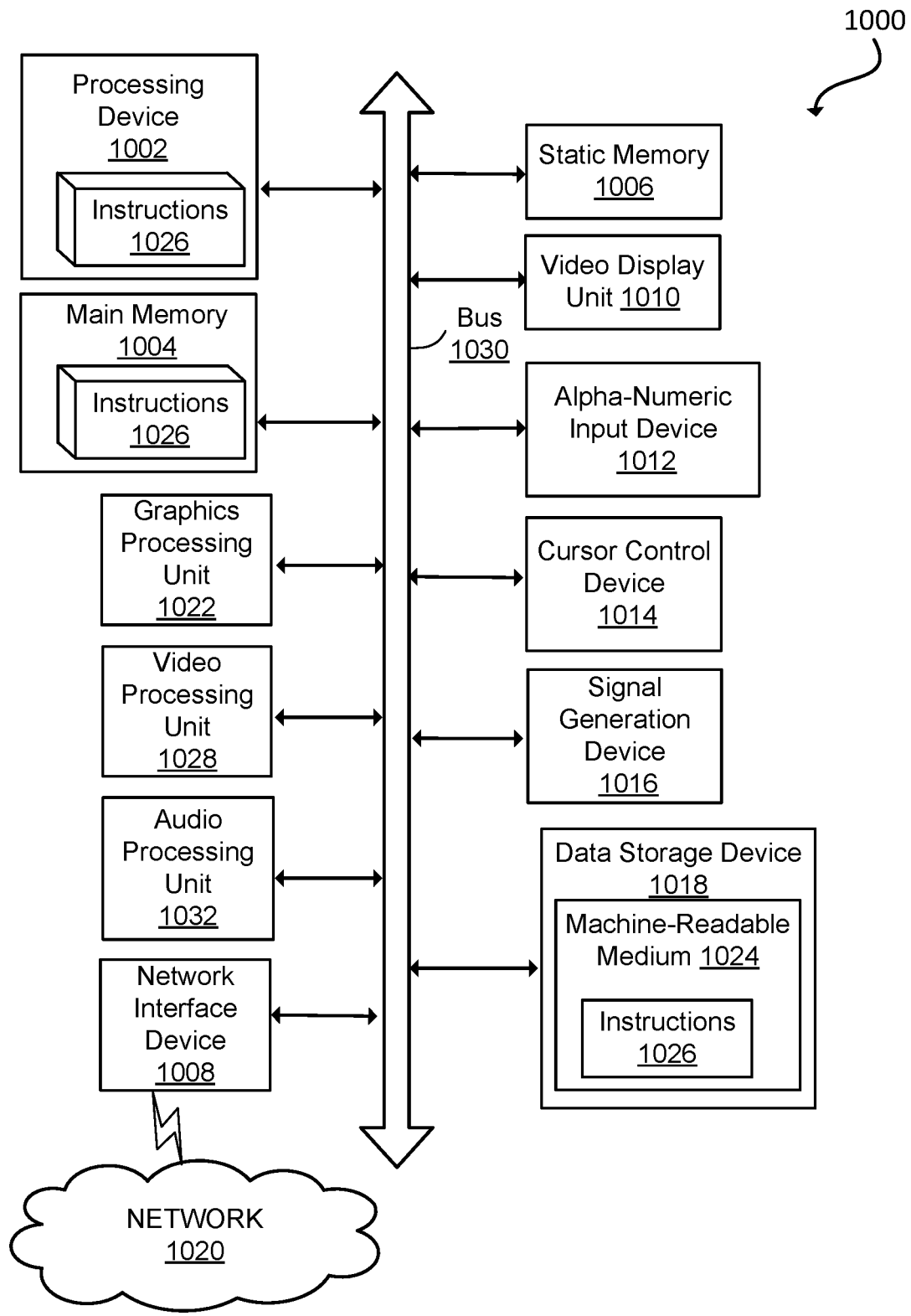
FIG. 10 depicts a diagram of an example computer system in which examples described herein may operate.

FIG. 10 illustrates an example of a computer system 1000 within which a set of instructions, for causing the computer system to perform any one or more of the methodologies discussed herein, including the method 50 of FIG. 1 and/or 928 of FIG. 9, may be executed. In some implementations, the computer system may be connected (e.g., networked) to other machines or computer systems in a local area network (LAN), an intranet, an extranet, and/or the Internet. The computer system may operate in the capacity of a server or a client computer system in client-server network environment, as a peer computer system in a peer-to-peer (or distributed) network environment, or as a server or a client computer system in a cloud computing infrastructure or environment.

The computer system may be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that computer system. Further, while a single computer system is illustrated, the term computer system shall also be taken to include any collection of computer systems that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030. The main memory 1004 includes or is a non-transitory computer readable medium. The main memory 1004 (e.g., a non-transitory computer readable medium) can store one or more sets of instructions 1026, that when executed by the processing device 1002, cause the processing device 1002 to perform some or all of the operations, steps, methods, and processes described herein, including the method 50 of FIG. 1 and/or 928 of FIG. 9.

Processing device 1002 represents one or more processors such as a microprocessor, a central processing unit, or the like. More particularly, the processing device 1002 may be or include complex instruction set computing (CISC) microprocessor, reduced instruction set computing (RISC) microprocessor, very long instruction word (VLIW) microprocessor, a processor implementing other instruction sets, or processor(s) implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing some or all of the operations, steps, methods and processes described herein, including the method 50 of FIG. 1 and/or 928 of FIG. 9.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (e.g., a non-transitory computer-readable medium) on which is stored one or more sets of instructions 1026 or software embodying any one or more of the methodologies or functions described herein, including the method 50 of FIG. 1 and/or 928 of FIG. 9. The instructions 1026 may also reside, completely or at least partially, within the main memory 1004 and/or within the processing device 1002 during execution thereof by the computer system 1000, the main memory 1004 and the processing device 1002 also including machine-readable storage media.

In some implementations, the instructions 1026 include instructions to implement functionality described above. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the computer system and that cause the computer system and the processing device 1002 to perform any one or more of the methodologies described above. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
   inserting a virtual partition cell in a parent cell of a layout of a design of an integrated circuit, wherein a child cell of the parent cell has a first portion that overlaps the virtual partition cell and a second portion that is outside of the virtual partition cell;
creating, by one or more processors, a hierarchy of cells having the child cell and the virtual partition cell descending from the parent cell, wherein the child cell has multiple instances in the hierarchy of cells, wherein a first instance of the multiple instances of the child cell is in a first tier of the hierarchy, wherein a second instance of the multiple instances of the child cell is in a second tier of the hierarchy, the second tier being lower in the hierarchy than the first tier;
performing a design rule check runset on the parent cell based on the hierarchy; and
performing a connectivity analysis of the parent cell by assigning identifiers to nets of the child cell and the virtual partition cell based on the hierarchy.

2. The method of claim 1, wherein the multiple instances of the child cell are associated with a same identification number.

3. The method of claim 1, wherein the design rule check runset for the virtual partition cell is performed by excluding from processing the second portion of the child cell that is outside the virtual partition cell.

4. The method of claim 1, further comprising adjusting a size of the virtual partition cell based on a size of another child cell encompassed by the virtual partition cell being adjusted.

5. The method of claim 1, wherein the second instance descends from the virtual partition cell in the hierarchy.

6. The method of claim 1, wherein the second instance is associated with the first portion of the child cell that overlaps the virtual partition cell, and wherein the first instance is associated with the second portion of the child cell that is outside of the virtual partition cell.

7. The method of claim 1, wherein the second instance in the hierarchy has nets that are assigned identifiers by reference to the first instance of the child cell in the hierarchy.

8. The method of claim 1, wherein virtual partition cells are ordered in the hierarchy before non-virtual partition cells.

9. The method of claim 1, further comprising inserting another virtual partition cell in the parent cell of the layout, wherein:
the virtual partition cell and the other virtual partition cell are non-overlapping in the layout of the design; and
the design rule check runset is performed at least partially concurrently for the virtual partition cell and the other virtual partition cell.

10. The method of claim 1, wherein the design rule check runset for a design rule check command is performed in an order starting from cells that are lowest in the hierarchy to highest in the hierarchy.

11. The method of claim 1, wherein performing the design rule check runset for a design rule check command comprises:
executing the design rule check command for the child cell; and
executing the design rule check command for the parent cell after the design rule check command is executed for the child cell.

12. The method of claim 1, wherein performing the design rule check runset comprises
executing a first design rule check command for the parent cell to generate model data; and
executing a second design rule check command for the virtual partition cell based on the model data generated by executing the first design rule check command for the parent cell.

13. An apparatus comprising:
a memory; and
one or more processors coupled to the memory, the memory and the one or more processors being configured to:
insert a virtual partition cell in a parent cell of a layout of a design of an integrated circuit, wherein a child cell of the parent cell has a first portion that overlaps the virtual partition cell and a second portion that is outside of the virtual partition cell;
create a hierarchy of cells having the child cell and the virtual partition cell descending from the parent cell, wherein the child cell has multiple instances in the hierarchy of cells, wherein a first instance of the multiple instances of the child cell is in a first tier of the hierarchy, wherein a second instance of the multiple instances of the child cell is in a second tier of the hierarchy, the second tier being lower in the hierarchy than the first tier; and
perform a design rule check runset on the parent cell based on the hierarchy; and
perform a connectivity analysis of the parent cell by assigning identifiers to nets of the child cell and the virtual partition cell based on the hierarchy.

14. The apparatus of claim 13, wherein the multiple instances of the child cell are associated with a same identification number.

15. The apparatus of claim 13, wherein the design rule check runset for the virtual partition cell is performed by excluding from processing the second portion of the child cell that is outside the virtual partition cell.

16. The apparatus of claim 13, wherein the memory and the one or more processors are further configured to adjust a size of the virtual partition cell based on a size of another child cell encompassed by the virtual partition cell being adjusted.

17. The apparatus of claim 13, wherein the memory and the one or more processors are configured to perform the design rule check runset by
executing a first design rule check command for the parent cell to generate model data; and
executing a second design rule check command for the virtual partition cell based on the model data generated by executing the first design rule check command for the parent cell.

18. A non-transitory computer-readable medium having instructions stored thereon to cause an apparatus to:
insert a virtual partition cell in a parent cell of a layout of a design of an integrated circuit, wherein a child cell of the parent cell has a first portion that overlaps the virtual partition cell and a second portion that is outside of the virtual partition cell;
create a hierarchy of cells having the child cell and the virtual partition cell descending from the parent cell, wherein the child cell has multiple instances in the hierarchy of cells, wherein a first instance of the multiple instances of the child cell is in a first tier of the hierarchy, wherein a second instance of the multiple instances of the child cell is in a second tier of the hierarchy, the second tier being lower in the hierarchy than the first tier;
perform a design rule check runset on the parent cell based on the hierarchy; and perform a connectivity analysis of the parent cell by assigning identifiers to nets of the child cell and the virtual partition cell based on the hierarchy.

\* \* \* \* \*